July 27, 1948.    D. WOLFSON ET AL    2,445,867
FLEXIBLE ANTIPICKING BLINDERS FOR POULTRY
Filed June 16, 1945

INVENTORS
David Wolfson
BY Hyman Sliden
S. J. Cox
ATTORNEY

Patented July 27, 1948

2,445,867

UNITED STATES PATENT OFFICE 2,445,867

FLEXIBLE ANTIPICKING BLINDERS FOR POULTRY

David Wolfson and Hyman Seiden, Far Rockaway, N. Y.

Application June 16, 1945, Serial No. 599,780

9 Claims. (Cl. 119—97)

The improvements relate to blinders or masks to be worn by fowl for the purpose of preventing them from picking one another and fighting, by intercepting the line of vision necessary to the performance of such acts. The loss or impairment of egg laying poultry due to these practices, particularly in flocks confined more or less closely in yards and coops and the need for preventive means are too well recognized and understood to require explanation here. Various devices for supplying this need have been provided, but all so far as is known are open to the objection that they interfere to a considerable extent with the normal life and feeding habits of the fowl and sometimes cause serious injury, reducing their productivity and requiring frequent examination and attention by and sometimes resulting in their loss to the poultry grower and egg producer.

It is customary to provide for the purposes stated a pair of metal disks, similar in form to the lenses of eyeglasses worn by humans, secured to the beak by an integral metal bridge passing thereover and a cotter pin or the like passed through holes in lugs thereon and through the nostils or breathing apertures of the beak from side to side, and consequently through the central membrane dividing the fowl's nasal breathing channel. This arrangement causes the fowl considerable discomfort both when applied and afterward, due to the irritation and distortion of the membrane and connected parts, when worn, and sometimes causes infection. It also imposes considerable weight of metal on the beak, and, because the metal of the device is inflexible, it will catch in the wire of the poultry enclosure when the fowl thrust their heads through the meshes of the enclosure, as they sometimes do, or in the protecting wire over the feed troughs and drinking fonts usually provided, as well as in other things. The fowl also frequently seek to remove the device by using their claws thus causing them irritation and injury. It even happens at times that the fowl will, in its efforts to disengage the device from some object in which it has become caught, tear off the upper part of its beak, and there is a slight electric action between the metal of the disks and bridge—usually aluminum—and the securing pin—usually stainless steel—which at least will cause some annoyance, particularly in wet weather.

The present improvements are designed primarily to remedy these faults and objections and to provide a masking device or blind of simple, strong and effective design which can be made at low cost, applied quickly and easily, with one hand only, and without injury to the fowl, and when so applied will serve the purpose intended without causing any material annoyance or discomfort, interfering with its normal living habits or exposing to the danger of accidental injury.

To this end the disks forming the blinds and their connecting bridge are made of thin, light, flexible and highly resilient material, such as rubber—which may be of the "regenerated" variety—or fabric impregnated with rubber or synthetic resin, and in the bridge is embedded or otherwise secured a metal clip having inwardly curved projecting ends to be passed into the nostril openings of the fowl and set in that position by suitable pliers so that the elastic material is securely clamped between the curved shank of the clip and the bill of the fowl and a cushion thus formed which will not only cause the projecting ends to be held constantly pressed into the bill but will protect the exterior of the bill against friction and abrasion by the metal.

The blinds are easily disengaged from any object in which they may be caught, on account of their high resiliency, and without subjecting the fowl to any shock or injurious strain, and the elastic connection between them and the beak will contribute materially to this. Moreover, any efforts of the fowl to remove the device will not cause injury either to the fowl or the device. Nor is it necessary for the prongs to pierce the central membrane of the bill, although this may be done by merely extending them and giving them less curvature, since they are constantly held in engagement by the compressed rubber cushion between them and the beak.

Other objects and advantages will be apparent to those familiar with the use of the devices from the following specification and the accompanying drawings, referred to therein, and in which Fig. 1 is a plan of an exemplary embodiment of the improvements in position on the beak of a fowl;

In the said drawings, 1 and 2 are the blinds and 3 the bridge connecting them and adapted to fit over the beak 4 of the fowl. These parts are integral and made of one piece of highly resilient material, such as rubber or fabric impregnated with a rubber or a phenol distillate generally designated as synthetic resin. The blinds 1 and 2 are of thin material so as to flex and yield readily and the bridge portion 3 is preferably thicker than the blinds and acts as a substantial base on which they can oscillate and bend freely.

Figure 3:
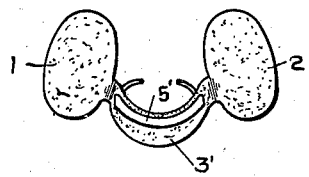
Fig. 3 is a plan of a modified form.
Figure 4:
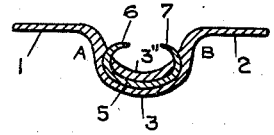
Fig. 4 is a substantially horizontal section on the line 4—4 of Fig. 1.

A clip member is embedded in the bridge 3 and has a curved body or shank portion 5 and curved projecting prongs 6 and 7 forming a part thereof. The body portion of the clip approximates the curved upper surface of the beak 4 and serves to stiffen and preserve the shape of the bridge 3. Preferably the bridge and blinds are molded in one operation and the part 5 of the clip embedded in the same operation with the prongs 6 and 7 projecting therefrom. In the modification of Fig. 3, however, the bridge 3' is made somewhat lighter and the clip 5' has its ends driven therethrough so as to be firmly connected therewith and positioned therein. The other parts in this figure are the same as the corresponding parts in Figs. 1, 2 and 4. In both forms the bridge is so molded as to have a tendency to contract and grip the beak thus adding to the snugness of its fit thereon.

When it is not desired to penetrate the central membrane 8 of the beak (Fig. 1) the prongs 6 and 7 are not pointed but are so curved as to turn forwardly and downwardly in the nasal passage, when contracted, on either side after passing through the openings 9 and 10 thereof and thus connect and secure the device in its proper position with the said beak. It will be seen that the portion 3" of the bridge and the portion 3' inside the clip and between it and the beak will be placed under some compression when the clip is set and thus contribute to the connection and also form a cushion. These portions will also adapt themselves to slight variations in the size and shape of the beak, and hold the device against any stress or strain tending to cause it to slip from its proper position.

Figure 1:
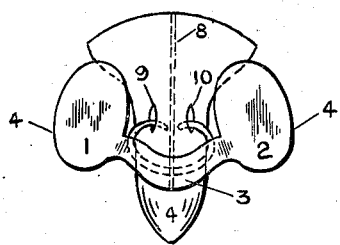
Figure 2:
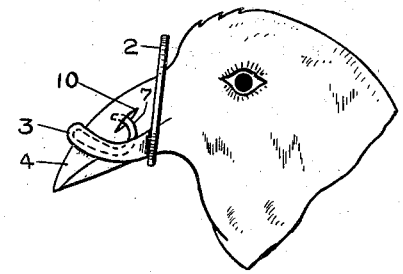
Fig. 2 is a side elevation of the same.
Figure 5:
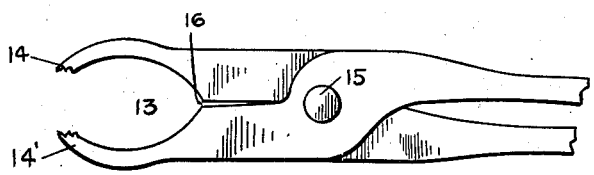
Fig. 5 is a side elevation of a pair of pliers for applying the device.

The pincers shown in Fig. 5 are of special form and comprise curved jaws 11 and 12 having a space 13 of considerable size between them adapted to clear the beak and terminating in teeth 14 spaced in "closed" position a predetermined distance, which grip and bite into the bridge at A and B when the blinders are to be applied, so that they will not slip but will under pressure close the prongs partly and to exactly the right extent, causing them to enter the nostril openings 9 and 10 and engage inside the beak and at the lower edges of the said openings, as shown by dotted lines in Figs. 1 and 2. The proper spacing of the teeth is controlled by contact of the jaw arms between them and the pivot 15 where they overlap, at 16. To apply the device, therefore, it is only necessary to pick it up by the jaws of the pincers, with the teeth engaged at A and B, bring the prongs 6 and 7 opposite the openings 9 and 10 then apply sufficient pressure to bring the jaw arms together at 16 and cause the said prongs to enter the beak, engage therein and be set. This can be done easily with one hand, while the other is left free to hold the fowl, which is a great advantage and cannot be done where a separate securing pin is used. In fact, the present device can be applied by one person, whereas the earlier forms required two to be properly and expeditiously applied.

What we claim is:

1. In a device of the character described, a pair of blinds, a bridge piece connecting them and normally curved to conform to the beak of the fowl, said blinds constituting a single piece of resilient non-metallic material, a relatively rigid metallic member for securing said piece to the beak comprising a body part connected with said bridge piece and integral prongs extending inwardly and laterally therefrom at both sides of the bridge piece and securing member.

2. In a device of the character described, a pair of blinds, a bridge piece connecting them and normally curved to conform to the beak of the fowl, said blinds constituting a single piece of resilient non-metallic material, a relatively rigid metallic member for securing said piece to the beak comprising a body part embedded in said bridge piece and curved to coincide therewith, and integral prongs extending inwarding and laterally therefrom at both sides of the bridge piece and adapted to secure said metallic member within the nostril openings of the beak when the device is positioned thereon.

3. In a device of the character described, a pair of blinds, a bridge plate connecting them and normally curved to conform to the beak of the fowl, said blinds constituting a single piece of resilient non-metallic material, a relatively rigid metallic member for securing said piece to the beak comprising a body part connected with said bridge piece and integral prongs extending inwardly and laterally therefrom at both sides of the bridge piece and securing member, the material of said bridge piece being interposed between the body part and the beak when the device is applied thereto and forming a cushion or resilient pad between said piece and beak.

4. In a device of the character described, a pair of blinds, a bridge piece connecting them and normally curved to conform to the beak of the fowl, said blinds constituting a single piece of resilient non-metallic material, a relatively rigid metallic member for securing said piece to the beak comprising a body part connected with said bridge piece and integral prongs extending inwardly and laterally therefrom at both sides of the bridge piece and securing member, the material of said bridge piece being interposed between the body part and the beak and being under compression when the device is applied thereto and forming a cushion or resilient pad between said piece and beak.

5. In a device of the character described, a pair of blinds, a bridge piece connecting them and normally curved to conform to the beak of the fowl, said blinds constituting a single piece of resilient non-metallic material, a relatively rigid metallic member for securing said piece to the beak comprising a body part connected with said bridge piece and integral prongs extending inwardly and laterally therefrom at both sides of the bridge piece and securing member, the material of said bridge piece being interposed between the body part and the beak when the device is applied thereto and forming a cushion or resilient pad between said piece and beak and exerting tension on said prongs.

6. In a device of the character described, a pair of blinds, a bridge piece connecting them and normally curved to conform to the beak of the fowl, said blinds constituting a single piece of resilient non-metallic material, a relatively rigid metallic member for securing said piece to the beak comprising a body part connected with said bridge piece and inwardly curved prongs extending inwardly and laterally therefrom to both sides of the bridge piece and securing member.

7. In a device of the character described, a pair of blinds, a bridge piece connecting them and normally curved to conform to the beak of the fowl, said blinds constituting resilient non-metallic material, a relatively rigid metallic member for securing said piece to the beak comprising a body part connected with said bridge piece, integral prongs extending inward from the end of said body part into proximity with the nostril openings of the beak when the device is positioned thereon and adapted to be forced through said nostril openings and into said beak to secure the device in position on the beak by compression of the metallic member.

8. In a device of the character described, a pair of blinds, a bridge piece connecting them and normally spanning the beak of the fowl, said blinds constituting resilient non-metallic material, said bridge piece including a relatively rigid metallic member for securing said device to the beak and which comprises a body part, and prongs extending inward from the ends of said body part into proximity with the nostril openings of the beak when the device is positioned thereon and adapted to be forced through said nostril openings and into said beak to secure the device in position on the beak by compression of the said metallic member.

9. In a device of the character described, a pair of blinds, a bridge plate connecting them and normally curved to conform to the beak of the fowl, said blinds constituting a piece of resilient non-metallic material, a relatively rigid metallic member for securing said piece to the beak comprising a body part connected with said bridge piece and integral prongs extending inwardly and laterally therefrom at both sides of the bridge piece and securing member, there being portions of said bridge piece exposed on the front of the device between the blinds and the said metallic securing member and disposed approximately normal to the blinds, whereby an implement for applying said device to the beak and securing it in position thereon comprising a pair of contractible jaws with teeth thereon for engaging the bridge and metallic member and carrying and contracting by pressure the metallic member to engage it within the nostril openings of the beak, may be employed for that purpose.

DAVID WOLFSON.
HYMAN SEIDEN.

REFERENCES CITED

The following references are of record in the file of this patent:

UNITED STATES PATENTS

| Number | Name | Date |
|---|---|---|
| D. 136,342 | Eisen | Sept. 14, 1943 |
| 181,175 | Huntoon | Aug. 15, 1876 |
| 1,973,569 | Kurtz | Sept. 11, 1934 |
| 2,079,107 | Cridlebaugh | May 4, 1937 |
| 2,181,070 | Rudolph | Nov. 21, 1939 |
| 2,217,891 | Cridlebaugh | Oct. 15, 1940 |
| 2,287,190 | Mitchell | June 23, 1942 |